US010754628B2

(12) United States Patent
Hernan et al.

(10) Patent No.: US 10,754,628 B2
(45) Date of Patent: Aug. 25, 2020

(54) EXTRACTING WEB API ENDPOINT DATA FROM SOURCE CODE TO IDENTIFY POTENTIAL SECURITY THREATS

(71) Applicant: MICROSOFT TECHNOLOGY LICENSING, LLC, Redmond, WA (US)

(72) Inventors: Shawn Valentine Hernan, Redmond, WA (US); Michael Hendrickx, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 8 days.

(21) Appl. No.: 16/179,617

(22) Filed: Nov. 2, 2018

(65) Prior Publication Data

US 2020/0142674 A1    May 7, 2020

(51) Int. Cl.
*G06F 8/40* (2018.01)
*G06F 21/57* (2013.01)
*G06F 9/54* (2006.01)

(52) U.S. Cl.
CPC ............... *G06F 8/40* (2013.01); *G06F 9/541* (2013.01); *G06F 21/577* (2013.01)

(58) Field of Classification Search
CPC .................................. G06F 8/40; G06F 9/541
USPC .................................. 717/136–161; 719/328
See application file for complete search history.

(56) References Cited

U.S. PATENT DOCUMENTS

| | | | | |
|---|---|---|---|---|
| 6,957,439 B1* | 10/2005 | Lewallen | ................... | G06F 8/51 717/106 |
| 2010/0083240 A1* | 4/2010 | Sinnan | ..................... | G06F 8/433 717/144 |
| 2012/0110174 A1* | 5/2012 | Wootton | ............... | G06F 21/564 709/224 |
| 2013/0055291 A1* | 2/2013 | Pierson | ................. | G06F 9/4484 719/328 |
| 2013/0138681 A1* | 5/2013 | Abrams | ............... | G06F 16/256 707/769 |
| 2015/0169432 A1* | 6/2015 | Sinyagin | ............. | G06F 11/3684 717/124 |
| 2015/0363492 A1* | 12/2015 | Laredo | ...................... | G06F 9/54 707/770 |

(Continued)

OTHER PUBLICATIONS

Karzynski, Michal, "Building Beautiful REST APIs using Flask, Swagger UI and Flask-RESTPlus", Retrieved from http://michal.karzynski.pl/blog/2016/06/19/building-beautiful-restful-apis-using-flask-swagger-ui-flask-restplus/, Jun. 19, 2016, 20 Pages.

(Continued)

*Primary Examiner* — Qing Chen
(74) *Attorney, Agent, or Firm* — Workman Nydegger (57) ABSTRACT

Embodiments disclosed herein are related to computing systems, and methods for extracting web API endpoint data from source code. Source code for various web services may be accessed. The source code may include portions of web Application Programming Interface (API) endpoint data that includes data necessary to invoke the underlying API. The source code may be automatically parsed to identify the portions of web API endpoint data. The identified portions of web API endpoint data may be translated into a format different from the source code that is usable by various applications that interact with the web services via the web API endpoint data.

20 Claims, 5 Drawing Sheets

(56) References Cited

U.S. PATENT DOCUMENTS

| | | | |
|---|---|---|---|
| 2016/0164994 A1* | 6/2016 | Aizenberg | G06F 16/2452 |
| | | | 709/203 |
| 2017/0078360 A1* | 3/2017 | Kumar | G06F 16/958 |
| 2017/0192827 A1* | 7/2017 | Ghafourifar | G06F 9/543 |
| 2018/0121320 A1* | 5/2018 | Dolby | G06F 11/3608 |
| 2018/0210768 A1* | 7/2018 | Dai | G06F 9/541 |
| 2018/0255089 A1* | 9/2018 | Wilton | H04L 63/0281 |
| 2018/0357154 A1* | 12/2018 | Dolby | G06F 11/3664 |

OTHER PUBLICATIONS

"International Search Report and Written Opinion Issued in PCT Application No. PCT/US19/057973", dated Jan. 29, 2020, 10 Pages. (MS# 405221-WO-PCT).

* cited by examiner

```
"/items/{id}": {
    "get": {
        "description": "Gets an item",
        "responses": {
            "200": { "description": "OK" }
        },
        "parameters": [
            {
                "in": "path",
                "name": "id",
                "description": "int id",
                "required": true,
                "schema": { "type": "integer" }
            }
        ]
    },
    "delete": {
        "description": "Removes an item",
        "responses": {
            "204": {
                "description": "Successful removal"
            }
        },
        "parameters": [
            {
                "in": "path",
                "name": "id",
                "description": "int id",
                "required": true,
                "schema": { "type": "integer" }
            }
        ]
    },
```

FIG. 3

```
{
    verb: "POST", ~401
    path: "/admin/users/{id}/update", ~402
    sourceFile: "c:\project\code\UserController.cs", ~403
    lineNumber: 421, ~404
    methodName: "PostData"
    parameters: ~405
    [
        { name: "id", appears: "path", type: "int" },
        { name: "name", appears: "body", type: "string" },
        { name: "address", appears: "body", type: "string" },
    ]
},
...
```

EXTRACTING WEB API ENDPOINT DATA FROM SOURCE CODE TO IDENTIFY POTENTIAL SECURITY THREATS

BACKGROUND

Several modern web applications rely on heavy use of JavaScript, which may depend on Representational State Transfer (REST) based API's, rather than forms and data served by classic, normal "markup based" web pages. However, discovering all the endpoints associated with the REST APIs is a challenge, as REST API's typically do not have a general description document (such as a WSDL document). This may lead to difficulties for outside web applications that are dependent on discovering all the endpoints so that they may interact with the web applications using the REST APIs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, and methods for extracting web API endpoint data from source code. Source code for various web services may be accessed. The source code may include portions of web Application Programming Interface (API) endpoint data that includes data necessary to invoke the underlying API. The source code may be automatically parsed to identify the portions of web API endpoint data. The identified portions of web API endpoint data may be translated into a format different from the source code that is usable by various applications that interact with the web services via the web API endpoint data.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Several modern web applications rely on heavy use of JavaScript, which may depend on Representational State Transfer (REST) based API's, rather than forms and data served by classic, normal "markup based" web pages. However, discovering all the endpoints associated with the REST APIs is a challenge, as REST API's typically do not have a general description document (such as a WSDL document).

Several automated tools, such as web application security scanners, rely on crawling hyperlinks. However, such automated tools may not be able to discover all the API endpoints and so may not be able to crawl all the hyperlinks. For web application security scanners, this may lead to security vulnerabilities being missed.

In some instances, an owner of the web application implementing the REST APIs may produce a document similar to a WSDL document that may identify the endpoints associated with the REST APIs. Such document may then be used by the web application security scanner or like applications to discover the relevant endpoints. However, having the owner of the web application produce the document identifying the endpoints may be time consuming. In addition, the owner may not properly identify all of the endpoints.

The embodiments disclosed herein solve these problems by providing a way to automatically extract the API endpoint data from underlying source code of the web application. The extracted API endpoint data may then be translated into a format that is useable by the web application security scanner or like applications to interact with the web application using the API endpoint data. For example, in the case of the security scanner all the API endpoints may be crawled to determine any security vulnerabilities.

The embodiments disclosed herein provide several technical advances over conventional systems. For example, embodiments disclosed herein access the underlying source code that implements a web service such as a web application. The underlying source code is then parsed to identify all of the API endpoint data in the source code. The identified API endpoint data may then be translated into a format that is useable by applications that interact with the web service. This may be stored in a database and provided as a file to the applications. This is a technical advance in that the API data is automatically identified and automatically placed in a format usable by other applications when interacting with the web application. In addition, there is a much less likely chance that any of the API endpoints are not identified. Further technical advances include efficiency gains and savings on computing resources as the process is automated.

Because the principles described herein may be performed in the context of a computing system, some introductory discussion of a computing system will be described with respect to FIG. 1. Then, this description will return to the principles of the embodiments disclosed herein.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
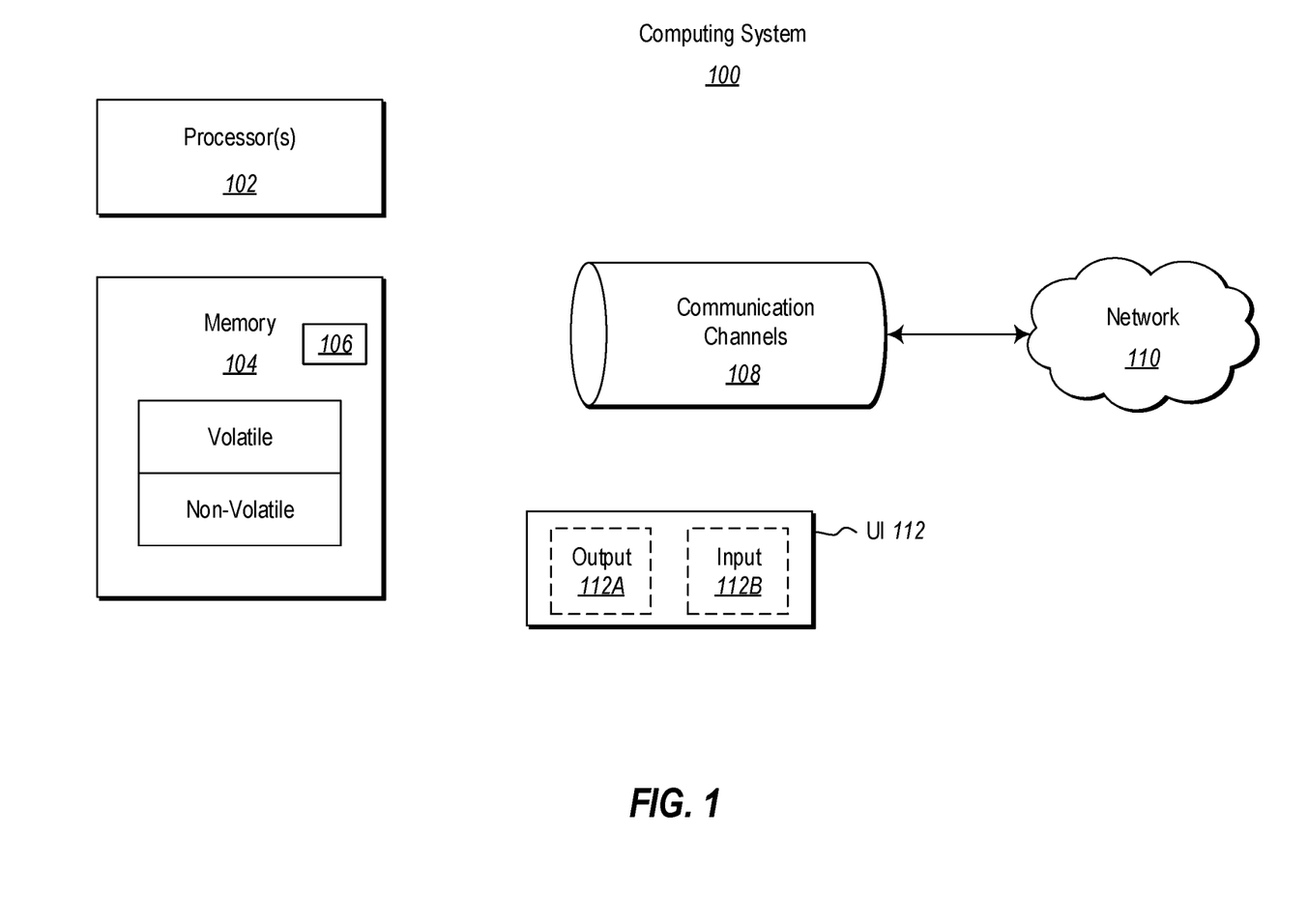
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 100 previously described. The computing systems of the remaining figures may include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
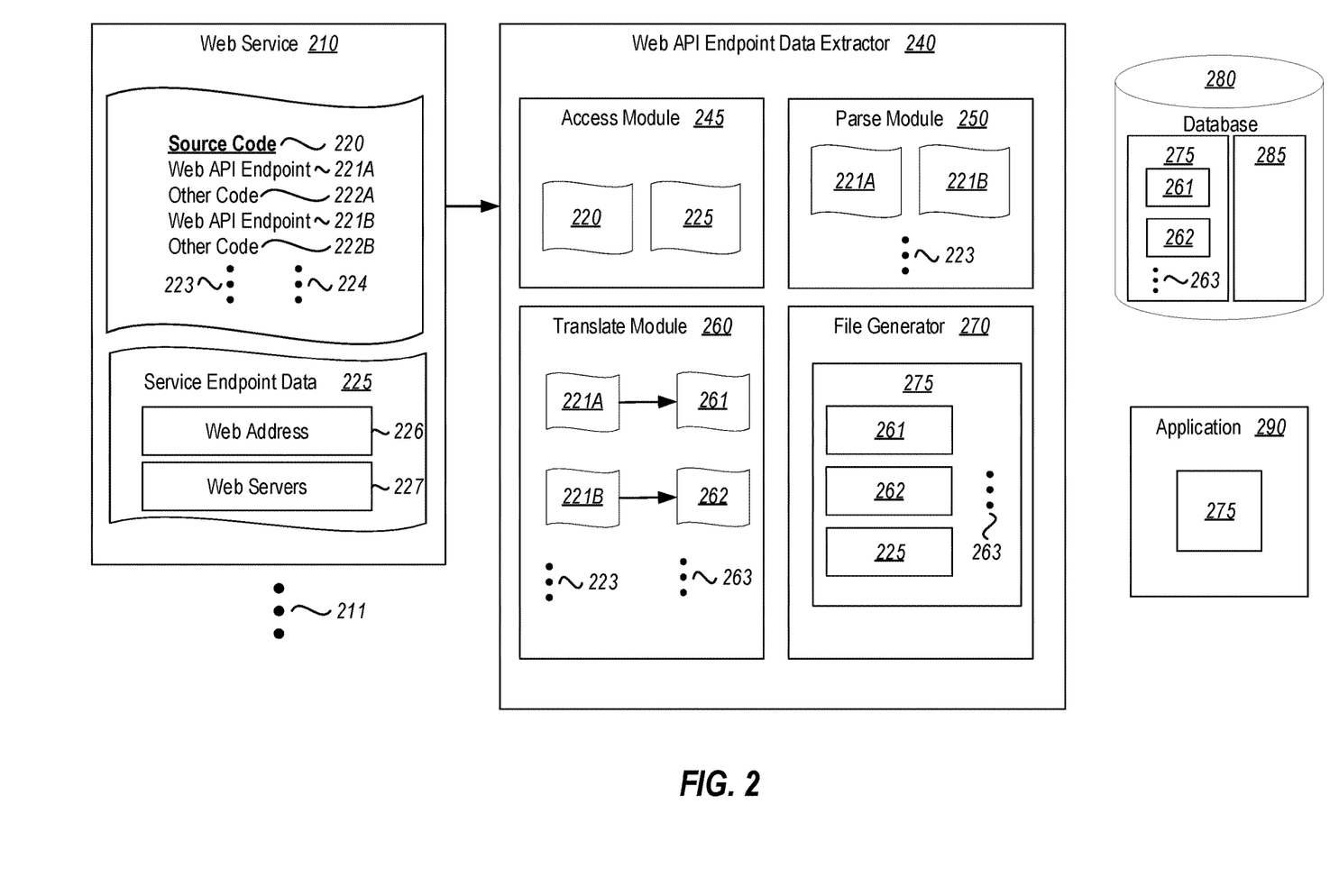
FIG. 2 illustrates an example environment for extracting web API endpoint data from source code.

FIG. 2 illustrates an environment 200 in which the embodiments disclosed herein may be practiced. It will be noted that the environment 200 is only one of many possible environments and thus is not to be used to limit the embodiments disclosed herein.

As illustrated, the environment 200 may include a web service 210. The ellipses 211 represent that there may be any number of additional web services as circumstances warrant. Accordingly, the description of web service 210 may apply to any of the additional web services 211. In some embodiments, the web services 200 may be, but is not limited to, a website or a web application. Accordingly, the embodiments disclosed herein are not limited to any particular type of web service 210 or 211.

As illustrated, the web service 210 may include source code 220. The source code 220 may be the programming code that is used to implement the web service 210. It will be noted that the source code 220 may be implemented in any reasonable computer programming language that is able to implement a web service. Accordingly, the embodiments disclosed herein are not limited to any particular type of source code or programming language.

The source code 220 that is used to implement the web service 210 may include web API endpoint data portions that includes the data necessary to invoke the underlying API so that third party applications and the like can interact with the web service 210. In addition, the source code 220 may include other code portions that are not web API endpoint data portions. For example, the source code 220 may include web API endpoint data 221A and 221B. The source code may also include other code portions 222A and 222B. The ellipses 223 represent that there may be any number of additional web API endpoint data portions included in the source code 220. The ellipses 224 represent that there may be any number of other code portions in the source code 220.

It will be noted that although in FIG. 2 the web API endpoint data portions and the other code portions are shown in an alternating fashion, this is for ease of illustration only to show that the source code 220 may include both portions. Accordingly, the web API endpoint data portions and the other code portions may be included in the source code 220 in any manner.

In some embodiments, the web service 210 may also include service endpoint data 225. The service endpoint data 225 may include a web address 226 of the web service 210 and/or identification information 227 of a web server that hosts the web service 210. Thus, the service endpoint data 225 may be any data that describes or specifies how and where the web service 210 is intended to be implemented.

As mentioned previously, in many embodiments a third party application or the like such as application 290 may desire to interact with the web service 210 via the web API endpoint data portions. However, the third party application 290 may not be able to properly identify all of the web API endpoint data portions. For example, the third party application 290 may be a web application security scanner application that is configured to scan the web service 220 for potential security threats that may be implemented using a web API endpoint. However, if the security scanner application is unable to properly identify all of the web endpoint data portions, then the security scanner may miss some potential security threats while performing a scan. Likewise, suppose the third party application 290 is an application that desires to interact with the web service 210 in some other manner. When the application 290 is unable to identify the relevant web API endpoints, the application may not be able to interact in the desired manner.

Advantageously, the embodiments disclosed herein provide for a novel way to extract the web API endpoint data portions from the source code 220 and to then provide the extracted data to the application 290 for use as will now be explained. Accordingly, the embodiments disclosed herein provide for a web API endpoint data extraction module 240.

The web API endpoint data extraction module 240 may include an access module 245. In some embodiments, the access module 245 may be configured to receive the source code 220 from the web service 210. In addition, the access module 245 may be configured to receive the service endpoint point data 225. Accordingly, in such embodiments the web service 210 may provide the source code 220 and the service endpoint data 225 to the access module 245 so that the web API endpoint data extraction module 240 may extract the web API endpoint data.

In alternative embodiments, however, the access module 245 may be configured to automatically retrieve the source code and the service endpoint data 225 from the web service 210. This provides a mechanism for the web API endpoint data extraction module 240 to periodically extract the web API endpoint data from the source code in the manner to be described in more detail without the need for the web service 210 to provide the source code.

The access module 225 may then provide the source code 220 to a parse module 250. In operation, the parse module may be configured to parse the source code 220 to identify the web API endpoint data portions that are included in the source code. For example, the parse module 250 may receive the source code 220 from the access module 245. The parse module 250 may then parse the source code 220 to identify the web API endpoint data portions 221A and 221B that are included in the source code 220. In addition, the parse module 250 may identify the additional web API endpoint data portions represented by the ellipses 223.

It will be noted that in some embodiments the parse module 250 is configured to automatically parse the source code 220 to identify the web API endpoint data portions. Accordingly, in such embodiments the web API endpoint data extraction module 240 is able to extract the web API endpoint data portions without the need for further input from a user or owner of the web API endpoint data extraction module 240 or from a user or owner of the web service 210.

The web API endpoint data extraction module 240 may also include a translation module 260. In operation, the translation module 260 may be configured to translate the identified web API endpoint data portions into a format that is different from the format of the source code 220. For example, the source code 220 may be implemented in a first format that is generally not useable by the third party application 290 when interacting with the web service 210. In other words, the third party application 290 is not able to read or otherwise utilize the source code 220 to identify the web API endpoint data portions such as 221A and 221B so that the web API endpoint data portions may be used to interact with the web service 210.

Accordingly, the translation module 260 may translate the web API endpoint data portions from the first format of the source code 220 into a second format that is different from the first format of the source code 220. For example, as illustrated in FIG. 2 the translation module 260 may translate the web API data portion 221A into the second format as denoted by 261, may translate the web API data portion 221B into the second format as denoted by 262, and may translate any of the additional web API data portions represented by the ellipses 223 into a second format as denoted by the ellipses 263. This second format may be a format that is usable by the third party application 290 to interact with the web service 210. In other words, the second format is a format that the third party application is able read or otherwise utilize so as to use the web API endpoint data portions to interact with the web service 210. Accordingly, the embodiments disclosed herein are not limited by any particular type of second format.

In one embodiment, the second format may be the swagger format. As is known to those of skill in the art, the swagger format is a format that may be used to describe the structure of each web API endpoint. In some embodiments, the swagger format may specify operations supported by each API, endpoint paths, various API parameters, and responses invoked by the API. Accordingly, the third party application 290 is able to use the web API endpoint data portions 261, 262, and 263 that have been translated into the swagger format to interact with the web service 210.

Figure 3:
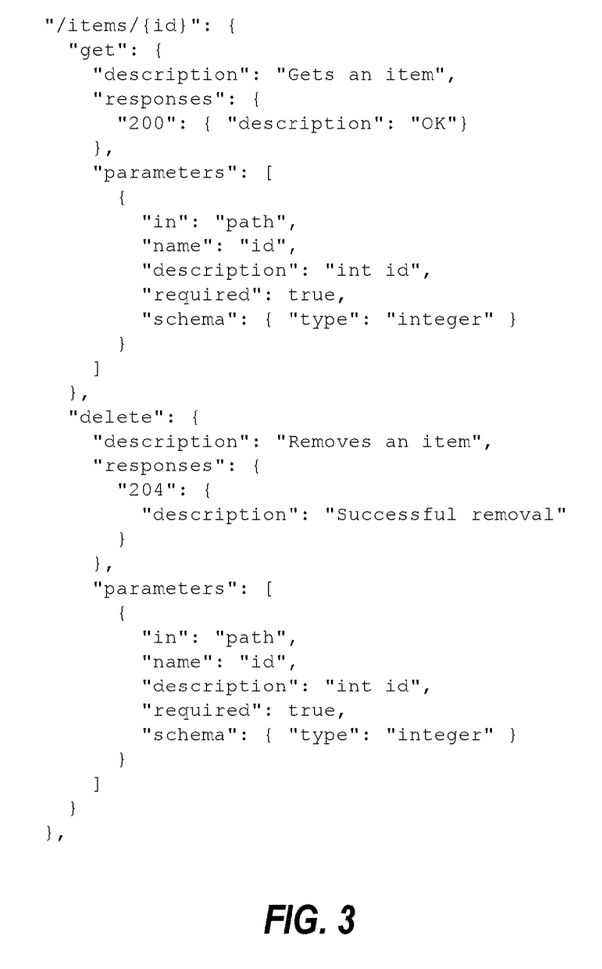
FIG. 3 illustrates an example embodiment of a swagger format.

An example of the swagger format is illustrated in FIG. 3. It will be noted that the swagger format may be useful when the API is a Representational State Transfer (REST) API.

In the embodiment where the third party application 290 is the security scanner, the security scanner is able to use the web API endpoint data portions 261, 262, and 263 so as to perform the security scan on the web service 210. Since all the web API endpoint data has been extracted from the source code 220 and translated into the swagger format (i.e., second format), the security scanner 290 is able to scan all of the web API endpoints to ascertain if there are any security vulnerabilities present.

In some embodiments, the web API endpoint data extractor module 240 may include a file generator 270. In addition, a database 280 may be associated with or otherwise accessible by the web API endpoint data extractor module 240. In operation, the file generator 270 may be configured to generate a file 275 that includes the web API endpoint data portions 261, 262, and 263 that have been translated into the second format in the manner previously described. The file 275 may then be stored in the database 280. In one embodiment, the file 275 may be provided to or accessed by the third party application 290 so that the third party application may use the web API endpoint data portions 261, 262, and 263 in the manner previously described.

In some embodiments, the file 275 may also include the service endpoint data 225 previously described. By including the service endpoint data 225 with the web API endpoint data portions 261, 262, and 263, the web API endpoint data portions 261, 262, and 263 may be bound to the specific implementation of the web service 210. That is, since the service endpoint data 225 may include the web address 226 and/or the web server identification information 227, the web API endpoint data portions 261, 262, and 263 are bound to the specific web address and/or web server that implements the web service 210.

In one embodiment, a metadata representation 285 of the web API endpoint data portions 261, 262, and 263 translated into the second format may be stored in the database 280. The metadata representation 285 may include a format that is more easily readable by a human user of the web API endpoint data extractor module 240 since the second format may be a format that is intended to be machine readable. This allows the human user to more easily determine the web API endpoint data portions that have been extracted from the source code 220. In operation, the file generator 270 may use the metadata representation 285 to derive the file 275 that is in the second format that is useable by the third party application 290. The derived file may then be provided to the third party application 290 for use in the manner previously described.

Figure 4:
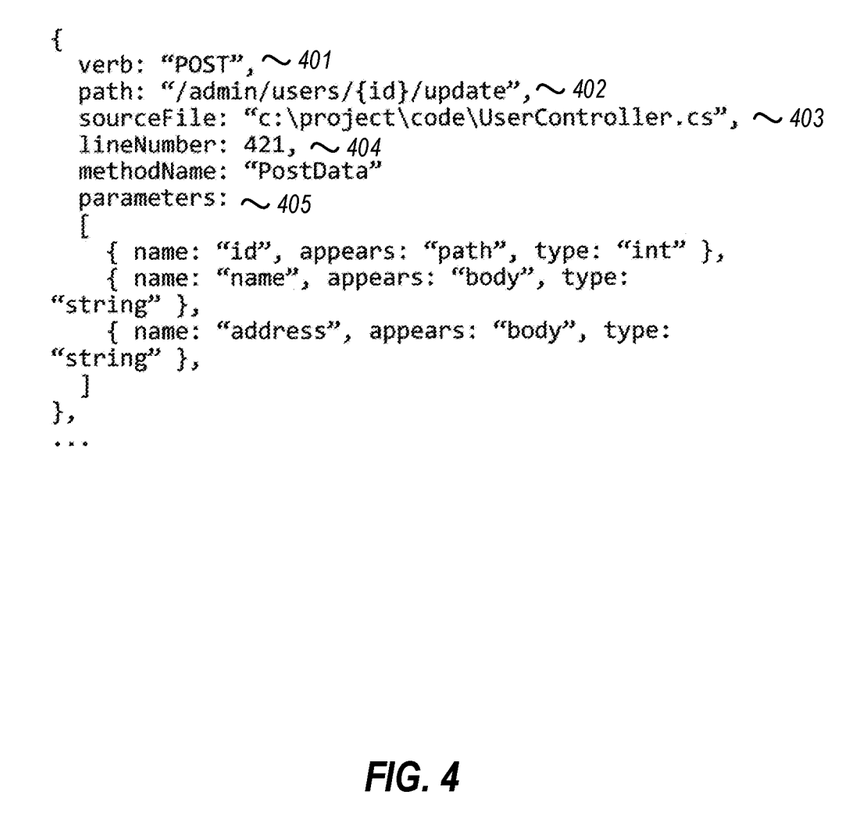
FIG. 4 illustrates an example embodiment of a metadata representation of web API endpoint data extracted from source code.

FIG. 4 illustrates an example of a metadata representation 285. As shown in the figure at 401, an endpoint verb, in this case "Post" may be included. The endpoint verb may define a response invoked by the API. Other examples of endpoint verbs may include "Get", "Put", "Patch" and "Delete". As shown at 402 and 403, a path and a source file may be defined. As shown at 404, a line number where the API endpoint method may be found is defined. As shown at 405, the various API parameters are defined.

In one embodiment, the database 280 may be implemented as a Structured Query Language (SQL) database. This advantageously allows the web API endpoint data portions 261, 262, and 263 to be searched using a SQL search for various desired information. For example, if a user of the web API endpoint data extractor module 240 desired to determine the number of a particular endpoint verb (i.e., put, get, post, patch, delete) that is found in the web API endpoint data portions 261, 262, and 263, the user could perform a SQL search for the desired endpoint verb. The results of the search may provide the number of the endpoint verbs found in the web API endpoint data portions 261, 262, and 263.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
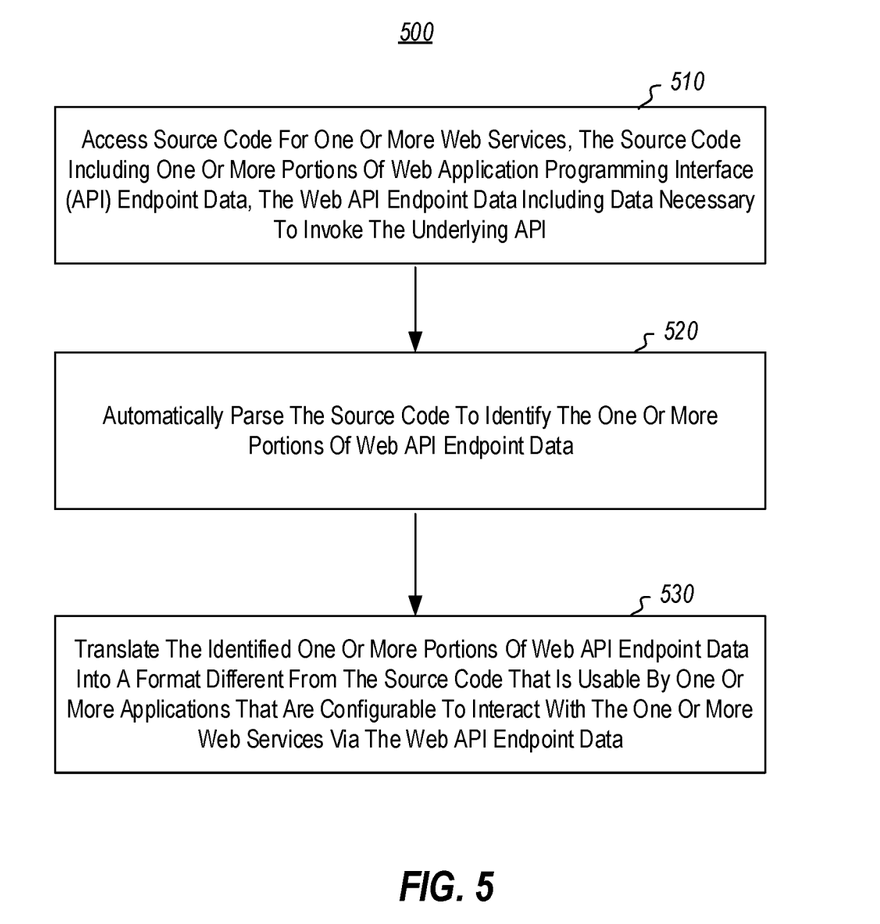
FIG. 5 illustrates a flow chart of an example method for extracting web API endpoint data from source code.

FIG. 5 illustrates a flow chart of an example method 500 for extracting web API endpoint data from source code. The method 500 will be described with respect to FIG. 2 discussed previously.

The method 500 includes accessing source code for one or more web services, the source code including one or more portions of web Application Programming Interface (API) endpoint data (510). The web API endpoint data includes data necessary to invoke the underlying API. For example, as previously described the access module of the 245 of the web API endpoint data extractor 240 may access the source code 220. The source code 220 may include web API endpoint data portions 221A, 221B, and potentially 223. In some embodiments, the service endpoint data 225 may also be accessed by the access module 245.

The method 500 includes automatically parsing the source code to identify the one or more portions of web API endpoint data (520). For example as previously described the parse module 250 may automatically parse the source code 220 to identify the web API endpoint data portions 221A, 221B, and potentially 223.

The method 500 includes translating the identified one or more portions of web API endpoint data into a format different from the source code (530). The translated format may be usable by one or more applications that interact with the one or more web services via the web API endpoint data. For example, as previously described the translate module 260 may translate the web API endpoint data portions 221A, 221B, and 223 into the web API endpoint data portions 261, 262, and 263 that are of the second format that is different from the format of the source code 220. In some embodiments, the second format may be the swagger format.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to analyze source code of a web Application Programming Interface (API) of a web service to identify endpoints of the web API to facilitate improved security scanning of the web service by identifying potential security threats that are implemented using the endpoints of the web API, the computing system comprising:

one or more processors; and one or more computer-readable hardware storage media that store computer-executable instructions that are executable by the one or more processors to cause the computing system to at least:

access source code for a web service, wherein the source code includes web API endpoint data, and wherein the web API endpoint data includes data necessary to invoke an underlying API of the web service;

automatically parse the source code for the web service to identify the web API endpoint data;

translate a first format of the identified web API endpoint data, which corresponds to a format of the source code for the web service, into a second format that is different from the first format such that translated second format of the identified web API endpoint data is generated, wherein the translated second format of the identified web API endpoint data is usable by one or more applications that are configurable to interact with the web service via the identified web API endpoint data;

identify one or more endpoints by the translated second format of the identified web API endpoint data; and provide access to the translated second format of the identified web API endpoint data to facilitate a security scan, which is performed by a scanning application, of the web service using the translated second format of the identified web API endpoint data, wherein the security scan of the web service includes crawling through the one or more endpoints identified by the translated second format of the identified web API endpoint data to determine whether a potential security vulnerability is present for any one of the one or more endpoints identified by the translated second format of the identified web API endpoint data.

2. The computing system of claim 1, wherein execution of the computer-executable instructions further causes the computing system to:

generate a file that includes the translated second format of the identified web API endpoint data.

3. The computing system of claim 2, wherein execution of the computer-executable instructions further causes the computing system to generate the file by:

storing a metadata representation of the translated second format of the identified web API endpoint data in a database; and generating the file from the metadata representation of the translated second format of the identified web API endpoint data.

4. The computing system of claim 2, wherein execution of the computer-executable instructions further causes the computing system to:

store the generated file in a database; and provide the generated file to the one or more applications.

5. The computing system of claim 4, wherein the generated file is configurable to be entered into a Structured Query Language (SQL) database and configurable to be searched by a SQL search.

6. The computing system of claim 1, wherein execution of the computer-executable instructions further causes the computing system to:

access service endpoint data that specifies how the web service is to be implemented; and include the service endpoint data in a file with the translated second format of the identified web API endpoint data to bind the translated second format of the identified web API endpoint data to the implementation of the web service.

7. The computing system of claim 6, wherein the service endpoint data includes one or more of a web server identification or a web address.

8. The computing system of claim 1, wherein the one or more applications include a security scanner, and wherein the security scanner is configured to use a generated file to scan the web service to determine one or more vulnerabilities in the source code for the web service.

9. The computing system of claim 1, wherein the translated second format of the identified web API endpoint data is a swagger format.

10. A method for analyzing source code of a web Application Programming Interface (API) of a web service to identify endpoints of the web API to facilitate improved security scanning of the web service by identifying potential security threats that are implemented using the endpoints of the web API, the method comprising:

accessing source code for a web service, wherein the source code includes web API endpoint data, and wherein the web API endpoint data includes data necessary to invoke an underlying API of the web service;

automatically parsing the source code for the web service to identify the web API endpoint data;

translating a first format of the identified web API endpoint data, which corresponds to a format of the source code for the web service, into a second format that is different from the first format such that translated second format of the identified web API endpoint data is generated, wherein the translated second format of the identified web API endpoint data is usable by one or more applications that are configurable to interact with the web service via the identified web API endpoint data;

identifying one or more endpoints by the translated second format of the identified web API endpoint data; and providing access to the translated second format of the identified web API endpoint data to facilitate a security scan, which is performed by a scanning application, of the web service using the translated second format of the identified web API endpoint data, wherein the security scan of the web service includes crawling through the one or more endpoints identified by the translated second format of the identified web API endpoint data to determine whether a potential security vulnerability is present for any one of the one or more endpoints identified by the translated second format of the identified web API endpoint data.

11. The method of claim 10, further comprising:

generating a file that includes the translated second format of the identified web API endpoint data.

12. The method of claim 11, further comprising:

storing a metadata representation of the translated second format of the identified web API endpoint data in a database; and generating the file from the metadata representation of the translated second format of the identified web API endpoint data.

13. The method of claim 11, further comprising:

storing the generated file in a database; and providing the generated file to the one or more applications.

14. The method of claim 13, wherein the generated file is configurable to be entered into a Structured Query Language (SQL) database and configurable to be searched by a SQL search.

15. The method of claim 10, further comprising:

accessing service endpoint data that specifies how the web service is to be implemented; and including the service endpoint data in a file with the translated second format of the identified web API endpoint data to bind the translated second format of the identified web API endpoint data to the implementation of the web service.

16. The method of claim 15, wherein the service endpoint data includes one or more of a web server identification or a web address.

17. The method of claim 10, wherein the translated second format of the identified web API endpoint data is a swagger format.

18. A computer system configured to analyze source code of a web Application Programming Interface (API) of a web service to identify endpoints of the web API to facilitate improved security scanning of the web service by identifying potential security threats that are implemented using the endpoints of the web API, the computer system comprising:
one or more processors; and
one or more computer-readable hardware storage media that store computer-executable instructions that are executable by the one or more processors to cause the computer system to at least:
access source code of an API of a web service, wherein the source code of the API of the web service includes programming code used to implement the API of the web service and further includes web API endpoint data of a web server that hosts the web service;
automatically parse the source code of the API of the web service to distinguish the web API endpoint data from the programming code;
for a scanning application that scans the web service to identify vulnerabilities, determine a machine-readable interaction format used by the scanning application to interact with the web service;
translate the web API endpoint data to cause the web API endpoint data to be formatted in the machine-readable interaction format used by the scanning application, wherein the translated format of the web API endpoint data is usable by one or more applications that are configurable to interact with the web service via the web API endpoint data;
identify one or more endpoints included within the translated format of the web API endpoint data; and
provide access to the translated format of the web API endpoint data to facilitate a security scan, which is performed by the scanning application, of the web service using the translated format of the web API endpoint data, wherein the security scan of the web service includes crawling through the one or more endpoints identified to be included within the translated format of the web API endpoint data to determine whether a potential security vulnerability is present for any one of the one or more endpoints identified to be included within the translated format of the web API endpoint data.

19. The computer system of claim 18, wherein the machine-readable interaction format is a swagger format.

20. The computer system of claim 19, wherein the swagger format specifies (i) operations supported by the API of the web service, (ii) paths of the one or more endpoints, (iii) parameters of the API of the web service, and (iv) responses invoked by the API of the web service.

* * * * *